United States Patent [19]

Meyer

[11] Patent Number: 5,697,847
[45] Date of Patent: Dec. 16, 1997

[54] TORSION BAR DRIVE COUPLING

[75] Inventor: Lawrence L. Meyer, Northville, Mich.

[73] Assignee: Eaton Corporation, Cleveland, Ohio

[21] Appl. No.: 562,320

[22] Filed: Nov. 22, 1995

[51] Int. Cl.$^6$ .................................................. F16D 3/56
[52] U.S. Cl. ........................................ 464/97; 464/160
[58] Field of Search ........................... 464/24, 97, 160, 464/161, 180, 182, 137, 147; 192/58.4

[56] References Cited

U.S. PATENT DOCUMENTS

| | | | |
|---|---|---|---|
| 1,965,742 | 7/1934 | Junkers | 464/24 X |
| 1,978,922 | 10/1934 | Wemp. | |
| 2,738,660 | 3/1956 | Gail | 464/24 |
| 3,131,554 | 5/1964 | Hornschuch et al. | 484/97 X |
| 3,608,131 | 9/1971 | Horschuch et al. | 464/97 X |
| 3,749,214 | 7/1973 | Leichliter | 192/58.4 |
| 4,127,080 | 11/1978 | Lakiza et al. | 464/97 X |
| 4,201,066 | 5/1980 | Nolan | 464/97 |
| 4,287,791 | 9/1981 | Numazawa et al. | |
| 4,712,663 | 12/1987 | Teraoka | 192/58.4 |
| 4,774,847 | 10/1988 | Breitweg | 464/97 X |
| 5,033,323 | 7/1991 | Janson | 464/97 X |
| 5,522,242 | 6/1996 | Hauser | 464/160 X |

FOREIGN PATENT DOCUMENTS

| | | | |
|---|---|---|---|
| 258175 | 3/1989 | Czech Rep. | |
| 2642719 | 12/1988 | France. | |
| 1755975 | 12/1971 | Germany | 464/24 |
| 1763753 | 9/1992 | U.S.S.R. | |
| 1004595 | 9/1965 | United Kingdom | 464/97 |

*Primary Examiner*—Daniel P. Stodola
*Assistant Examiner*—Eileen A. Dunn
*Attorney, Agent, or Firm*—Loren H. Uthoff, Jr.; L. J. Kasper

[57] ABSTRACT

A viscous damped driveline coupling has two concentric tubes concentric with a torsion bar where the torsion bar is nonrotatably connected to both a drive coupling and a driven coupling. An outer tube has a first end connected to the drive coupling and a second end connected to a driven ring where the driven ring contacts ring forks contacting the driven coupling at travel stops thereby providing for lost motion between the driven coupling and the outer tube. A concentric inner tube is connected to the driven coupling and is viscously coupled to the outer tube. As the torsion bar transfers relatively low levels of torque between the drive and driven couplings, the viscous layer between the outer and inner tubes provides viscous damping. Upon contacting the travel stops, the outer tube then carries any additional torque in the driveline coupling.

5 Claims, 2 Drawing Sheets

FIG I

TORSION BAR DRIVE COUPLING

BACKGROUND OF THE INVENTION

1. Field of the Invention

The present invention relates to a driveline coupling that provides torsion vibration absorption. More specifically, the present invention relates to a driveline coupling that utilizes a torsion bar to provide a relatively low spring rate coupling with concentric inner and outer tubes having a viscous fluid residing therebetween for damping of the system.

2. Description of the Prior Art

In a conventional prior art driveline coupling, torsional ridgedity of the connecting driveshaft is relatively high causing unpleasant noise or extraordinary vibration between subsystems of the vehicle driveline such as an engine and gear-change transmission. To reduce the undesired noise vibration, it is desirable to introduce a low spring rate element having a certain amount of damping associated therewith to provide for the reduction of torsional vibration of the driveline to prevent damage and improve driveability. It is well known that the rotational speed of an engine output crankshaft varies even during so called steady state operation of the engine where the output shaft continuously accelerates and decelerates about the average speed of the shaft. The accelerations and decelerations are largely a result of power pulses from the engine cylinders. Whether uniform or not, the torque pulses, which result in what are here referred to as torsional vibration, are commonly transmitted through vehicle driveline into the vehicle structure and ultimately to the passengers therein. Torsional vibration is detrimental to driveline components and also can affect passenger comfort in a negative fashion.

In the prior art, various types of vehicle torsional damping mechanisms which both isolate and dampen torsional vibration have been devised with limited success. For example, master clutches used in combination with manual shift mechanical transmissions have long employed torsional damping mechanisms having spring isolators and mechanical friction damper devices disposed in parallel with one another to attenuate and dampen driveline torque changes and resulting torsional vibration. One such device is disclosed in U.S. Pat. No. 4,782,932, the disclosure of which is hereby expressly incorporated by reference. In this device, a torsional damping mechanism is adapted to be disposed between the engine and the attached transmission and includes a viscous damping device in parallel with a torque transmitting torsion spring bar. Also, another torsional damping assembly is disclosed in U.S. Pat. No. 4,790,792, the disclosure of which is hereby expressly incorporated by reference, which discloses a device having a torsion damping assembly which includes a spring in a viscous damper. The spring assembly is disposed in parallel to a dampening section where the spring is a torsion shaft and a plurality of circumferential grooves are used to supply viscous damping by the introduction of a viscous substance such as silicone injected between the gap formed between the grooves and a like number of engaging annular rings.

Still another method to provide a torsional vibration damping assembly is disclosed in U.S. Pat. No. 1,978,922, the disclosure of which is hereby expressly incorporated by reference, which utilizes a low spring rate torsion sleeve capable of flexing substantially more than the coil springs used with master clutches. This arrangement, like the master clutch arrangement, helps employ secondary friction surfaces disposed in parallel and biased together with a predetermined force to provide torsional vibration damping.

None of the prior art devices provide for the transmission of the driveline torque from an engine disposed substantial distance away from the gear-change transmission wherein the driveshaft of the engine must be coupled to the remote mounted transmission by way of a driveshaft wherein the driveshaft provides a substantial amount of torsional vibration damping.

SUMMARY OF THE INVENTION

The purpose of the present invention is to provide for the coupling of an engine crankshaft with a remote mounted gear-change transmission or for the coupling of a gear-change transmission to a rear axle differential wherein the coupling supplies a predetermined amount of torsional vibration isolation by way of a torsion bar coupled at a first end to a drive device and at a second end to a driven device. For example, an engine crankshaft can be coupled to a remotely mounted gear-change transmission wherein low displacement and low torque torsional isolation of the engine shaft relative to the gear-change transmission is transmitted solely by the torsional bar. Higher levels of torque generated by the engine can be transferred to the gear-change transmission is supplied by way of a tubular driveshaft encircling the torsion bar coupling. A selected amount of viscous damping is introduced to the drive coupling by way of an inner tube in close proximity to the outer tube in the driveshaft where a gap therebetween is filled with a viscous fluid. Relative motion of the outer tube relative to the inner tube as the torsion bar is torsionally stressed provides for the optimum amount of torsional vibration absorption, thereby preventing high levels of torsional vibration which could result in transmission and/or engine crankshaft damage and/or noise and vibration transmitted into the vehicle structure and ultimately into the passenger compartment. After a given amount of torsion bar displacement, a stop is encountered by the outer tube which results in additional torque by the outer tube rather than the torsion bar.

One provision of the present invention is to provide a torsion bar coupling between an engine and a gear-change transmission.

Another provision of the present invention is to provide a torsional coupling with viscous damping between an engine crankshaft and a gear-change transmission.

Another provision of the present invention is to provide a torsional coupling having viscous damping introduced by way of concentric tubes concentric with a torsion bar coupling.

Another provision of the present invention is to provide a torsional coupling between an engine crankshaft and a gear-change transmission wherein the torsion bar is concentric with both inner and outer concentric tubes having a viscous fluid therein providing a selected damping coefficient.

Another provision of the present invention is to provide a torsional coupling having an outer tube which has lost motion until a given amount of torsion bar displacement is reached whereupon the outer tube is grounded to a driven coupling.

Still another provision of the present invention is to provide a torsional coupling wherein a torsion bar transmits relatively low level torque between an engine and gear-change transmission and concentric outer tubes are viscously coupled thereby providing for a given amount of viscous damping wherein the outer tube transmits the engine torque which exceeds the capacity of the torsion bar.

DETAILED DESCRIPTION OF THE PREFERRED EMBODIMENT

Figure 1:
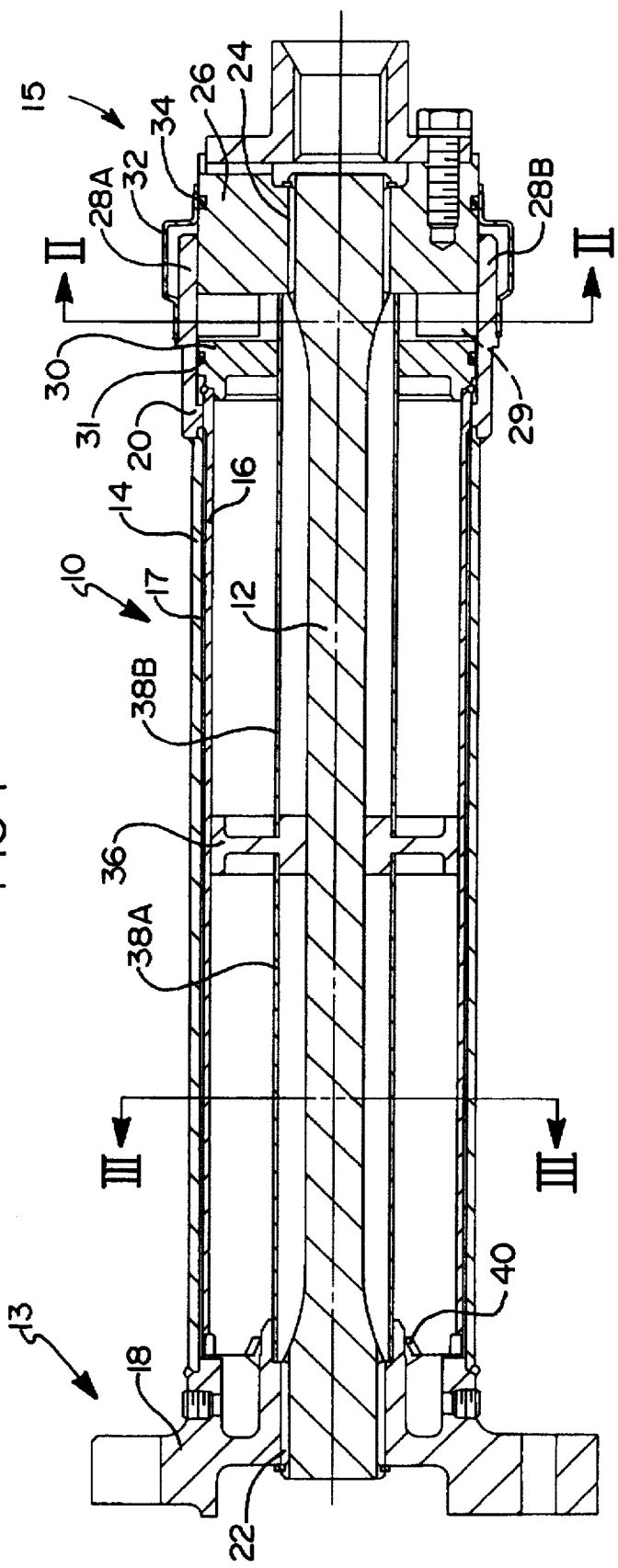
FIG. 1 is a cross-sectional view of the torsion bar coupling of the present invention.

Reference is now made to FIG. 1 of the drawings wherein a cross-sectional view of the torsion bar coupling 10 of the present invention is shown. A torsion bar 12 is disposed inside concentric tubes, an outer tube 14 and an inner tube 16, where the inner tube 16 is diametrically spaced from the outer tube 14 with a radial clearance of approximately 0.004 inches. In the clearance volume between the outer tube 14 and the inner tube 16 a viscous substance (which may be a silicone liquid such as polydimethylsiloxane having a viscosity of 100,000 mPa.s) is introduced and held between the outer tube 14 and the inner tube 16 such that when relative motion between the outer tube 14 and inner tube 16 occurs, a certain level of viscous damping is introduced by the shear of the viscous layer 17.

The first end 13 of the torsion bar coupling 10 is nonrotatably attached to a source of driveline power such as an internal combustion engine (not shown) by way of drive coupling 18 which is coupled to the torsion bar 12 by mating drive splines 22 formed on both the torsion bar 12 and the drive coupling 18. The second end 15 of the torsion bar coupling 10 is attached to a driveline component that is to be driven by the source of driveline power such as a gearchange transmission (not shown) by way of driven coupling 26 which is coupled to the torsion bar 12 by mating drive splines 24 formed on both the torsion bar 12 and the driven coupling 26. The torsion bar coupling 10 functions to provide a torsionally damped rotational coupling between two driveline components while providing some torsional vibration isolation between the components by use of a low spring rate torsion bar coupling 10 which is torsionally damped by viscous shear that occurs between two concentric driveshaft tubes 14 and 16 when the torsion bar 12 is operating between two limits of wind-up.

The inner tube 16 is attached to the tube carrier 30 which is keyed to rotate with the driven coupling 26. Thus, as the torque is transmitted by the torsion bar 12, the outer tube is free to move relative to the driven coupling 26 and hence, also rotates relative to the inner tube 16. This relative motion between the outer and inner tubes 14, 16 results in viscous shear of the silicone fluid contained in viscous layer 17 which introduces damping to the torsion bar 12.

The drive coupling 18 is connected to the torsion bar 12 by way of drive splines 22 where the drive coupling 18 is commonly attached to a driveline component such as an engine or a transmission and the driven coupling 26 is attached to a transmission or a differential. Attached to the inner tube 16 is tube carrier 30 which is an annular element encircling the torsion bar 12 in a seal to the inner surface of the driven ring 20 by way of seal 31 which functions to prevent the migration of the viscous fluid out of the volume formed by the outer tube 14 and the inner tube 16. Cover 32 functions with seal 34 to prevent contaminants from entering the assembly. Cover 32 is attached to the driven ring 20 and rotates relative to the driven coupling 26. Thus, seal 34 allows the cover 32 to rotate with the outer tube 14 and driven ring 20 relative to the driven coupling 26 while sealing against entry of foreign debris.

The outer tube 14 which functions to carry the majority of the high torque energy of an engine or other power producing device is attached to an annular drive coupling 18, at one end and attached to a driven ring 20 at a second end. The driven ring 20 extends in two separate segments to form spring forks 28A and 28B which engage the annular driven coupling 26. The driven coupling 26 is nonrotatably attached to the torsion bar 12 by way of drive spline 24. The driven coupling 26 is then nonrotatably joined to the vehicle transmission or other driveline component for rotation therewith. The inner tube 16 is concentric with the outer tube 14 and is radially spaced therefrom.

Spacer 36 is designed to be positioned at approximately the mid point of the inner tube 16 so as to prevent unnecessary bending of the torsion bar 12 by way of mechanical support between the inner tube 16 and the torsion bar 12 at its mid point. In addition, a left centering tube 38A and a right centering tube 38B are positioned concentric with torsion bar 12 and closely spaced to the torsion bar 12 to provide for some degree of lateral fixation to reduce bending of the torsion bar 12 as it is torsionally stressed both in a positive direction and a negative direction. The left centering tube 38A is supported by the spacer 36 and at the drive coupling 18 whereas the right centering tube 38B is supported by the spacer 36 and the driven coupling 26.

Figure 2:
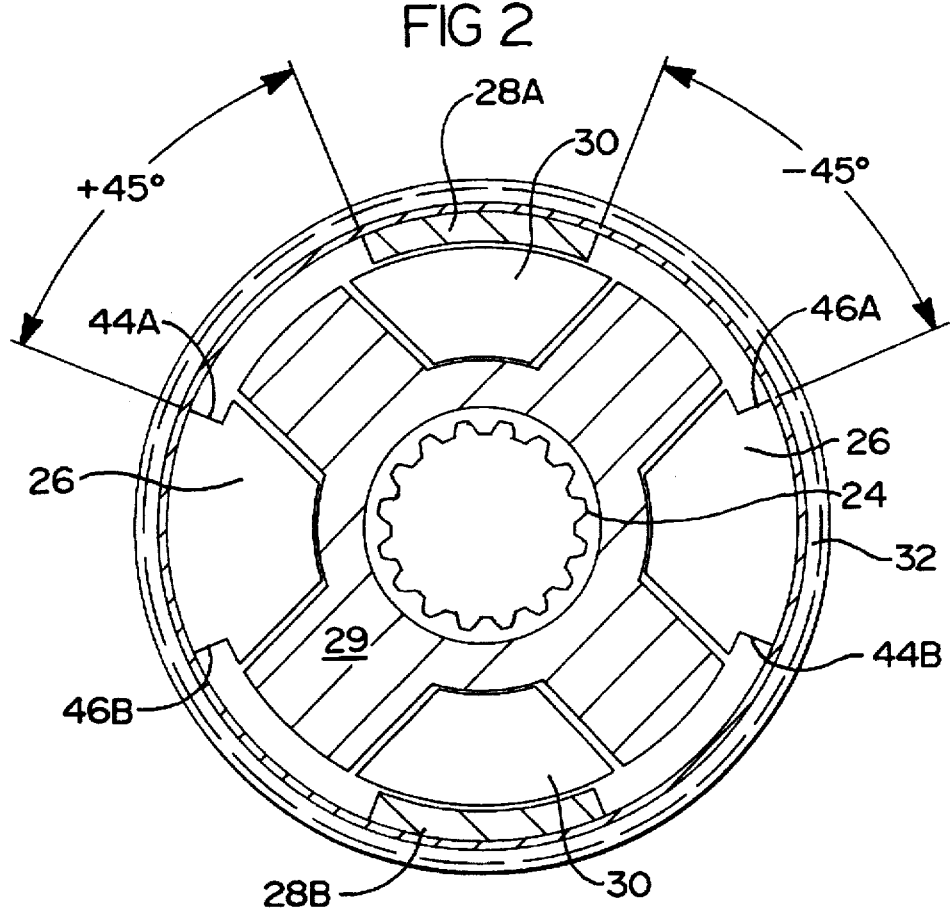
FIG. 2 is a sectional view of the torsion bar coupling of the present invention taken along line II—II of FIG. 1.

Now referring to FIG. 2 of the drawings, a cross-sectional view of the torsion bar coupling 10 of the present invention is taken along line II—II of FIG. 1 is shown. The spring forks 28A and 28B which are attached to and part of the driven ring 20 which is attached to the outer tube 14 can freely move up to ±45° from a centered position allowing for the relative movement of the outer tube 14 and the driven coupling 26. The lost motion allows the torsion bar 12 to twist a positive 45 degrees and a negative 45 degrees from an unstressed position before engagement of the outer tube 14 to the driven coupling 26. Thus, the torsion bar 12 can transmit a relatively low level of torque depending on its torsional structure characteristics between the drive coupling 18 and the driven coupling 26 up to a torque level which produces either a positive 45 degrees or a negative 45 degrees of travel of the spring forks 28A and 28B relative to the driven coupling 26. In the present device, a maximum torsion bar torque of ±300 lb-ft. was selected. At the point that the spring forks 28A and 28B travel a positive 45 degrees the spring fork 28A encounters stop 44A and likewise the spring fork 28B encounters stop 44B thereby preventing further torsional twisting of the torsion bar. When the spring forks 28A and 28B contact their respective travel stops 44A and 44B respectively, then the outer tube 14 begins to carry the load of the drive system and provide for power transfer through the spring forks 28A and 28B into the driven coupling 26. Prior to the ±45 degrees of relative rotation of the spring forks 28A and 28B, the torsion bar 12 is transmitting all torque with relative motion of the outer and inner tubes 14, 16 providing damping to the torsion bar 12 spring.

In a similar manner, when the spring fork 28A encounters travel stop 46A when the relative rotation of the drive coupling 26 and the outer tube 14 reach a total of a minus 45 degrees as illustrated in FIG. 2 and the spring fork 28B contacts the travel stop 46B then the outer tube 14 carries any additional output torque. As the outer tube 14 moves when the torsion bar 12 is twisted, the viscous shear between the outer tube 14 and the inner tube 16 which rotates with the driven coupling 26 provides for viscous damping of the torsional vibration of the torsion bar 12 spring. After the outer tube spring forks 28A and 28B contact the driven coupling 26 then there is no relative movement of the outer and inner tubes 14 and 16 and no viscous damping occurs.

Coupling spacer 29 functions to maintain the geometry of the second end 15 of the torsion bar coupling 10 by acting as a spacer between the driven coupling 26 and the tube carrier 30. There exists a small amount of clearance between the coupling spacer 29 and both the driven coupling 26 and the tube carrier 30 allowing for approximately ±1 degree of travel bar 12 prior n bar 12 prior to introducing dampening with the outer and inner tubes 14 and 16. Both the driven coupling 26 and the tube carrier 30 are shown as each having two axial extension portions that engage the coupling spacer 39 with a small amount of rotational clearance therebetween to allow the torsion bar 12 to be stressed without engaging the viscous damping of the viscous layer 17 between the outer and inner tubes 14, 16. This free play improves torsional vibration isolation at lower torque levels. It also establishes a surface against which the ring forks 28A and 28B pass over when the torsion bar 12 is stressed. Note that the coupling spacer 29 does not engage the torsion bar drive splines 24.

Figure 3:
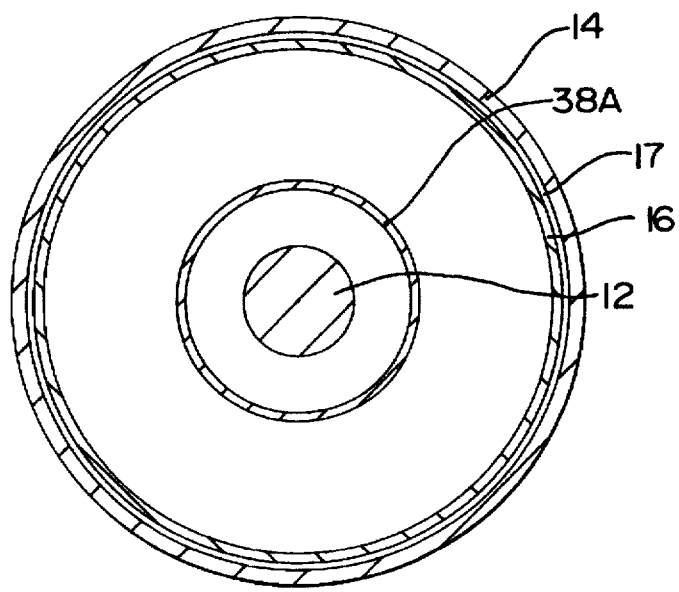
FIG. 3 is a cross-sectional view of the torsion bar coupling of the present invention taken along line III—III of FIG. 1.

Now referring to FIG. 3 of the drawings, a cross-section of the torsion bar coupling 10 of the present invention is shown taken along line III—111 of FIG. 1. Clearly shown is the viscous layer 17 which consists of a viscous fluid such as silicone occupying the space between the outer tube 14 and the inner tube 16. Also shown is the left centering tube 38A which functions to limit bending of the torsion bar 12 when torque is transferred from the drive coupling 18 to the driven coupling 26 and visa versa. The torsion bar 12 material is selected to accommodate the torsional stress experienced in operation which are limited as the ring forks 28A and 28B contact the travel stops 44A, 46A and 44B, 46B respectively. With a 36 inch long torsion bar coupling 10 producing 300 lb-ft. of torque at 45° of travel, the torsion bar 12 was made of VASCOMAX 300 and heat treated at 900° to Rc 50/55.

Although the present invention has been described in its preferred form with a certain degree of particularity, it is understood that the present disclosure of the preferred embodiment has been made only by way of example, and that numerous changes in the detail construction and combination and arrangement of the parts may be resorted to without departing from the spirit and the scope of the invention as hereinafter claimed.

I claim:

1. A driveline coupling comprising:
   a drive coupling;
   a driven coupling;
   a torsion bar having a first end nonrotatably connected to said drive coupling and a second end nonrotatably connected to said driven coupling;
   an outer tube concentric with said torsion bar, said outer tube having a first end connected to said drive coupling;
   a driven ring attached to said outer tube having a plurality of ring forks axially extending therefrom engaging said driven coupling so as to contact a travel stop when said torsion bar is stressed to a predetermined level thereby allowing a limited relative rotation between a second end of said outer tube and said driven coupling;
   an inner tube concentric to said outer tube having viscous fluid therebetween, said inner tube connected to said driven coupling;
   where said drive coupling rotates relative to said outer tube thereby transferring torque between said drive coupling and said driven coupling through said torsion bar and creating viscous damping between said outer tube and said inner tube.

2. The driveline coupling of claim 1, further comprising a seal cover attached to said drive ring contacting a seal in said driven coupling for sealing said outer tube and said driven coupling.

3. The driveline coupling of claim 1, wherein said inner tube is connected to an annular tube carrier, said tube carrier nonrotatably linked to said driven coupling and rotatably sealed at an outer peripheral surface to said driven ring.

4. The driveline coupling of claim 1, wherein further comprising; a tube carrier connected to said inner tube; and a coupling spacer engaging said tube carrier and said driven coupling.

5. The driveline coupling of claim 4, wherein a relatively small amount of rotational clearance is provided between said tube carrier and said driven coupling in said coupling spacer.

\* \* \* \* \*